United States Patent
Shi et al.

(10) Patent No.: US 11,572,487 B2
(45) Date of Patent: Feb. 7, 2023

(54) WATER BASED SEALER WITH SUPERIOR DURABILITY

(71) Applicant: BEHR PROCESS CORPORATION, Santa Ana, CA (US)

(72) Inventors: Jinzhen Shi, Fountain Valley, CA (US); Karen Ann Nguyen, Huntington Beach, CA (US); Ming-Ren Tarng, Irvine, CA (US)

(73) Assignee: Behr Process Corporation, Santa Ana, CA (US)

( * ) Notice: Subject to any disclaimer, the term of this patent is extended or adjusted under 35 U.S.C. 154(b) by 0 days.

(21) Appl. No.: 17/158,727

(22) Filed: Jan. 26, 2021

(65) Prior Publication Data

US 2021/0147705 A1 May 20, 2021

Related U.S. Application Data

(63) Continuation of application No. 15/223,929, filed on Jul. 29, 2016, now Pat. No. 10,934,449.

(51) Int. Cl.
*B05D 7/24* (2006.01)
*C09D 133/06* (2006.01)

(52) U.S. Cl.
CPC ........... *C09D 133/066* (2013.01); *B05D 7/24* (2013.01); *B05D 2210/00* (2013.01); *B05D 2502/00* (2013.01)

(58) Field of Classification Search
CPC ... B05D 7/24; B05D 2210/00; B05D 2502/00
See application file for complete search history.

(56) References Cited

U.S. PATENT DOCUMENTS

| | | | |
|---|---|---|---|
| 3,933,204 A | 1/1976 | Knapp | |
| 5,294,653 A * | 3/1994 | Colucci | C09D 133/066 524/109 |
| 5,714,532 A * | 2/1998 | Osterholtz | C09D 183/06 524/114 |
| 5,849,835 A | 12/1998 | Das et al. | |
| 6,462,139 B1 | 10/2002 | Das et al. | |
| 6,678,495 B1 | 1/2004 | Badesha et al. | |
| 7,728,075 B2 | 6/2010 | Schellekens et al. | |
| 8,546,479 B2 | 10/2013 | Billiani et al. | |
| 8,580,894 B2 | 11/2013 | Palushaj et al. | |
| 8,663,740 B2 | 3/2014 | Flosbach et al. | |
| 2007/0042192 A1 | 2/2007 | Nguyen et al. | |
| 2009/0005494 A1 | 1/2009 | Luo et al. | |
| 2013/0102216 A1 | 4/2013 | Turner et al. | |
| 2015/0166823 A1 | 6/2015 | Huybrechts et al. | |
| 2015/0322292 A1 | 12/2015 | Pierce et al. | |

FOREIGN PATENT DOCUMENTS

| | | |
|---|---|---|
| CN | 103228751 A | 7/2013 |
| CN | 104327628 A | 2/2015 |
| EP | 0562283 | 9/1993 |
| KR | 10586272 | 6/2006 |
| KR | 20060079517 | 7/2006 |
| WO | 97/22646 A1 | 6/1997 |

OTHER PUBLICATIONS

Dow, Dow Corning Z-6040 silane product information coupling agents, Sep. 24, 2001, pp. 1-4 (2001).
Gellner Industrial, LLC, "Water Based Industrial Polymers," KX-99 Technical Data Sheet, 2014, 4 pgs.
STC Search Report for structure in claim 31 (2019).
Dispersion, Infoplease, The Columbia Electronic Encyclopedia, 6th ed., Copyright 2012, Columbia Univ. Press (2012).
First Examination Report dated Jul. 23, 2020 for Indian Appn. No. 201917002685, 6 pgs.
International Search Report dated Sep. 21, 2017 for PCT Appn. No. PCT/US17/38913 filed Jun. 23, 2017, 2 pgs.
Chinese Appn. No. 201780056250.9, Office Action dated Aug. 7, 2020, 8 pgs.

* cited by examiner

*Primary Examiner* — Hai Y Zhang
(74) *Attorney, Agent, or Firm* — Brooks Kushman P.C.

(57) ABSTRACT

A sealer composition includes a first component and a second component. The first component includes water and a hydroxyl functionalized acrylic resin. The second component includes an epoxy silane cross-linker. Characteristically, the first component and second component are mixed at most 40 hours prior to application of the sealer composition to a substrate.

10 Claims, 1 Drawing Sheet

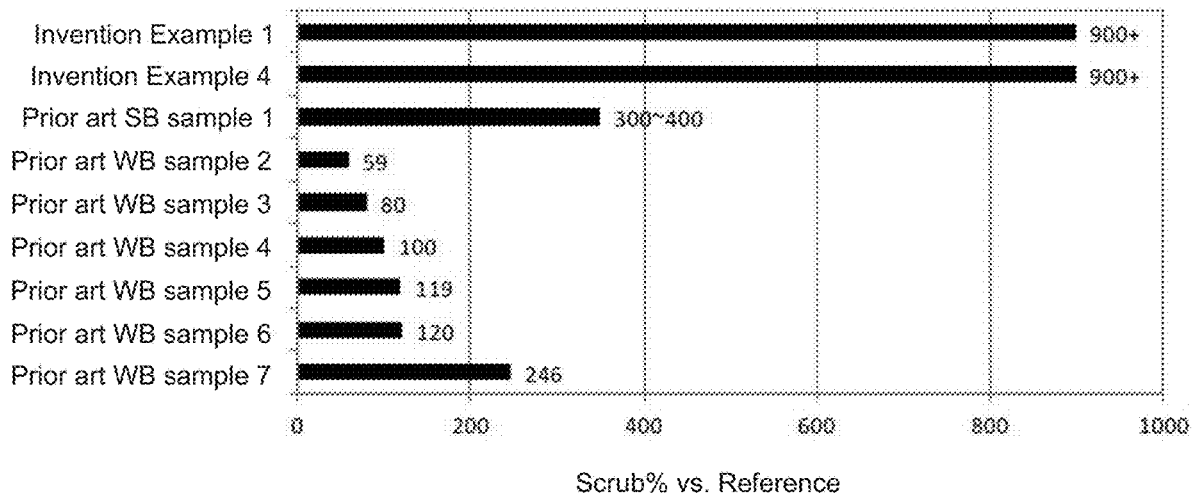

WATER BASED SEALER WITH SUPERIOR DURABILITY

CROSS-REFERENCE TO RELATED APPLICATIONS

This application is a continuation of U.S. application Ser. No. 15/223,929 filed Jul. 29, 2016, now U.S. Pat. No. 10,934,449 issued Mar. 2, 2021, the disclosure of which is hereby incorporated in its entirety by reference herein.

TECHNICAL FIELD

In at least one embodiment, the present invention is related to water based coatings from which a sealing coating can be formed.

BACKGROUND

Paints and related coatings are ubiquitous finding numerous applications for both aesthetic and functional applications. In many applications, coatings are applied to improve the aesthetic appeal of a surface by providing a uniform and pleasing appearance. In other applications, coatings are used has a clear coat on various substrates to provide some degree of protection. In additional to the visual effects, paint coatings can also be applied to porous substrates such as concrete and masonry for sealing purposes.

In this regard, it is known that many coating compositions do not adhere well to metal substrates such as aluminum. Although prior art coating compositions work reasonably well with respect to concrete and masonry, these prior art coatings are known to have only modest durability. In particular, these coatings degrade in practice when exposed to environmental conditions or when they are washed over time.

Accordingly, there is a need for paint compositions that can durably seal porous substrates and/or adhere to metal substrates such as aluminum.

SUMMARY

In at least one embodiment, the present invention solves one or more problems of the prior art by providing a sealer composition for forming a coating on a substrate. The sealer composition includes a first component and a second component. The first component includes water and a hydroxyl functionalized acrylic resin. The second component includes an epoxy silane cross-linker. Characteristically, the first component and second component are mixed prior to application of the sealer composition to a substrate.

In another embodiment, a sealer composition for forming a coating on a substrate is provided. The sealer composition includes a first component and a second component. The first component includes water and a hydroxyl functionalized acrylic resin. The second component includes an epoxy silane cross-linker selected from the group consisting of:

glycidoxypropyl trimethoxysilane,

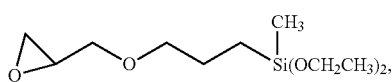

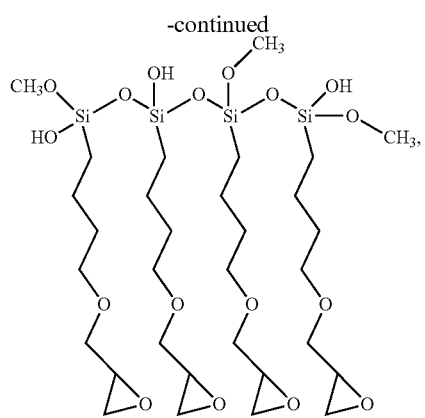

and combinations thereof. Characteristically, the first component and second component are mixed at most 40 hours prior to application of the sealer composition to a substrate.

In another embodiment, a method of applying the sealer composition set forth above to a substrate is provided. The sealer composition includes a first component and a second component. The first component includes water and a hydroxyl functionalized acrylic resin. The second component includes an epoxy silane cross-linker. Additional details of the first and second components and their constituents are set forth above. The sealer composition is applied by mixing the first component and the second component to form a coating mixture. The substrate is coated with the coating mixture to form an uncured coated substrate. The uncured coated substrate is allowed to cure to form a sealer coating on the substrate.

Advantageously, the sealer composition of the present invention produces coatings exhibits improved scrub and scratch resistance when compared to prior art compositions.

BRIEF DESCRIPTION OF THE DRAWINGS

FIG. 1 provides a bar chart comparing the scrub resistance of coating examples of the present invention compared to several prior art coatings.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of" and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

In an embodiment, a sealer composition for forming a coating on a substrate is provided. The sealer composition includes a first component and a second component. The first component includes water and a hydroxyl functionalized acrylic resin. Typically, the pH of the first component is less than 7. In particular, the pH of the first component is from 4 to 6. The second component includes an epoxy silane cross-linker. Characteristically, the first component and second component are mixed prior to application of the sealer composition to a substrate. In some refinement, the first and second components are mixed at most 40 hours prior to application of the sealer composition to a substrate. In a refinement, the first and second components are mixed immediately prior to 40 hours prior to application of the sealer composition to a substrate. In other refinements, the first and second components are mixed up to, in increasing order of preference, 40, 30, 20, 10, 5, 3, 2, 1, or 0.5 hours prior to application of the sealer composition to a substrate.

In a variation, the hydroxyl functionalized acrylic resin includes a hydroxyl functional acrylic polymer. In a refinement, the hydroxyl functionalized acrylic resin is a solution polymer. In another refinement, the hydroxyl functionalized acrylic resin is an emulsion polymer. Suitable hydroxyl functionalized acrylic resins are formed from hydroxyl derivatives of the monomers selected from the group consisting of methacrylate, methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate, pentafluorophenyl methacrylate, pentafluorophenyl acrylate, 1,1,1,3,3,3-hexafluoroisopropyl acrylate, bis-(2,2,2-trifluoroethyl) itaconate, bis-(1,1,1,3,3, 3-hexafluoroisopropyl), 1H,1H,3H-hexafluorobutyl acrylate, 1H,1H,7H-dodecafluoroheptyl methacrylate, 2,2,2-trifluoroethyl acrylate, 2,2,2-trifluoroethyl methacrylate, aliphatic, fluorinated aliphatic, 1H,1H,2H,2H-Heptadecafluorodecyl methacrylate 532.2 acrylic, 1H,1H,2H,2H-heptadecafluorodecyl acrylate, 1H, 1H,5H-octafluoropentyl acrylate, 1H, 1H,3H-tetrafluoropropyl methacrylate, hexafluoro-iso-propyl, 1H,1H,3H-hexafluorobutyl methacrylate, 1H,1H,5H-octafluoropentyl methacrylate, and combinations thereof. In a further refinement, the hydroxyl functionalized acrylic resin is a copolymer of the hydroxyl monomer derivatives and the monomers (not hydroxyl functionalized) set forth above.

As set forth above, the sealer composition includes an epoxy alkoxy silane cross-linker. Examples of suitable epoxy alkoxy silane cross-linker include, but are not limited to:

glycidoxypropyl trimethoxysilane,

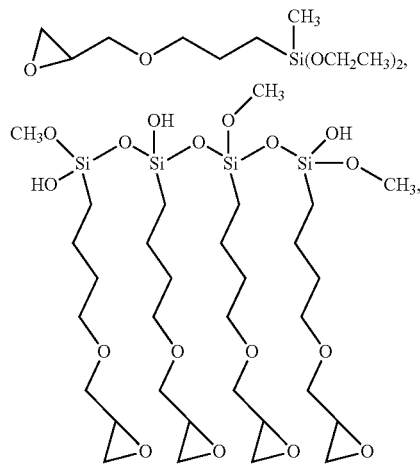

and combinations thereof.

In another variation, the hydroxyl functionalized acrylic resin is present in an amount of 75 to 95 percent of the dry weight of the combined weight of the first component and the second component, the epoxy silane cross-linker is present in an amount of 5 to 25 percent of the dry weight of the combined weight of the first component and the second component with the balance being water. In a refinement, the hydroxyl functionalized acrylic resin is present in an amount of 80 to 90 percent of the dry weight of the combined weight of the first component and the second component and the epoxy silane cross-linker is present in an amount of 10 to 20 percent of the dry weight of the combined weight of the first component and the second component with the balance being water.

In some variations of the sealer composition, the first component further includes one or more additives selected from the group consisting of rheology modifiers, surfactants, defoamers, organic solvents, pH adjusters, UV stablizers, dispersants, coalescents, biocides, inorganic pigment, organic pigments, and combinations thereof. Therefore, in a refinement, the hydroxyl functionalized acrylic resin is present in an amount of 75 to 95 percent of the dry weight of the combined weight of the first component and the second component, the epoxy silane cross-linker is present in an amount of 5 to 25 percent of the dry weight of the combined weight of the first component and the second component, and the additives being present in an amount of 0.1 to 10 percent of the combined weight of the total formulation with the balance being water. In one refinement, volatile organic compounds are present in an amount less than 100 g/liter.

In a variation, the sealer composition can include a matting agent to adjust the gloss to a lower sheen. The matting agent can be any extender pigment that does not add opacity to the clear coat, such as silicas, nepheline syenite, and the like. In a refinement, the matting agent is present in an amount from about 0.2 to 8 percent of the dry weight of the combined weight of the first component and the second component.

In another embodiment, a method of applying the sealer compositions set forth above to a substrate is provided. The sealer composition includes a first component and a second component. The first component includes water and a hydroxyl functionalized acrylic resin. The second component includes an epoxy silane cross-linker. Additional details of the first and second components and their constituents are set forth above. The sealer composition is applied by mixing the first component and the second component to form a coating mixture. The substrate is coated with the coating mixture to form an uncured coated substrate. The uncured coated substrate is allowed to cure to form a sealer coating on the substrate. In one refinement, the substrate is a concrete or masonry substrate. In some refinements, the substrate is a pre-coated substrate with paint, coatings or stains, the sealer coating being a clear topcoat. In another refinement, the substrate is metal. In still another refinement, the substrate is pavement, artificial stone and stucco. In other refinement, the sealer coating is topcoat over a paint or stain. In still other refinements, the sealer coating is a dry erase coating.

The following examples illustrate the various embodiments of the present invention. Those skilled in the art will recognize many variations that are within the spirit of the present invention and scope of the claims.

Table 1 provides compositions for four examples of embodiments of the invention. It should be appreciated that the resin and silane choices are not limited to the listed examples. The gloss was measured on 3 mil drawdown on Leneta 3B card with BYK-Gardner gloss meter.

TABLE 1

Water based high gloss clear concrete sealer formula

| Component | Example 1 (gram) | Example 2 (gram) | Example 3 (gram) | Example 4 (gram) |
|---|---|---|---|---|
| Part A | | | | |
| water | 16.9 | 20.9 | 20.7 | 16.9 |
| solvent | 1.1 | 1.1 | 1.1 | 1.1 |
| Hydroxyl acrylic solution polymer | 76.2 | | | 76.2 |
| Hydroxyl acrylic latex polymer | | 73.7 | 73.9 | |
| Wetting agent | 0.5 | 0.5 | 0.5 | 0.5 |
| Defoamer | 0.5 | | | 0.5 |
| Defoamer | | 0.3 | 0.3 | |
| UV stabilizer | 0.3 | 0.3 | 0.3 | 0.3 |
| Part B | | | | |
| silane A | 4.6 | | 3.2 | |
| silane B | | 3.2 | | |
| silane C | | | | 4.6 |
| Total | 100.0 | 100.0 | 100.0 | 100.0 |
| Properties | | | | |
| Gloss at 60 degree | 88 | 86 | 82 | 81 |

A matting agent is added into the high gloss formula to adjust the gloss to a lower sheen as shown in the compositions of Table 2. The matting agent can be any extender pigment that does not add opacity to the clear coat, such as silicas, nepheline syenite etc.

TABLE 2

Water based clear concrete sealer formula

| Component | Example 5 (gram) | Example 6 (gram) | Example 7 (gram) |
|---|---|---|---|
| Part A | | | |
| water | 21.75 | 14.15 | 33.3 |
| solvent | 1 | 1 | 1.1 |
| Hydroxyl acrylic solution polymer | 71 | 79 | |
| Hydroxyl acrylic latex polymer | | | 61.4 |
| Wetting agent | 1 | 0.6 | 0.5 |
| Defoamer | 0.5 | 0.5 | 0.34 |
| UV stabilizer | | | |
| Matting Pigment | 0.75 | 0.75 | 0.75 |
| Part B | | | |
| silane A | 4 | 4 | 2.7 |
| Total | 100 | 100 | 100 |
| Properties | | | |
| Gloss at 60 degree | 35 | 20 | 12 |

Metal Adhesion

The clear coat adheres to aluminum substrates while similar prior art compositions do not have this property (see Table 3). Adhesion on aluminum Q-panel (normally considered as a difficult-to-adhere substrate) indicates this clear coat can be potentially used as a DTM clear coat.

TABLE 3

Crosshatch adhesion on Aluminum Q-Panels

| Sample name | crosshatch adhesion dry/wet |
|---|---|
| Invention example formula 1 | 5B/5B |
| Invention example formula 3 | 5B/5B |
| Prior art SB sample 1 | 5B/5B |
| Prior art WB sample 2 | 0B/0B |
| Prior art WB sample 3 | 0B/0B |
| Prior art WB sample 4 | 0B/0B |
| Prior art WB sample 5 | 5B/5B |
| Prior art WB sample 6 | 0B/0B |
| Prior art WB sample 7 | 0B/0B |

Dry Erase

The clear coat can be used on top of coated or uncoated surfaces, and exhibits excellent dry erase properties, while the other products in the sealer category do not have this property. This indicates the clear coat can be used as a dry erase coating.

Experiment: Brush 2 coats of sealer prototypes or commercial sealer products on the clay tile, let it dry completely. Draw lines on the coated tile with Expo Dry Erase Markers, let it dry for 10 min and 24 hours, then erase with dry paper towel. The rating is tabulated as below, where Y=erasable, N=not erasable.

TABLE 4

Dry erase properties of clear coat

| | Expo Dry Erase Marker (red) | | Expo Dry Erase Marker (green) | |
|---|---|---|---|---|
| Sample name | 10 min | 24 hr | 10 min | 24 hr |
| Invention example formula 1 | Y | Y | Y | Y |
| Invention example formula 2 | Y | Y | Y | Y |
| Invention example formula 3 | Y | Y | Y | Y |
| Prior art SB sample 1 | Y | Y | Y | N |
| Prior art WB sample 2 | N | N | N | N |
| Prior art WB sample 3 | N | N | N | N |
| Prior art WB sample 4 | N | N | N | N |
| Prior art WB sample 5 | N | N | N | N |
| Prior art WB sample 6 | N | N | N | N |
| Prior art WB sample 7 | N | N | N | N |

FIG. 1 provides a bar chart comparing the scrub resistance of coating examples of the present invention compared to several prior art coatings. The scrub resistance is determined according to ASTM D2486; the entire disclosure of which is incorporated by reference. The results are reported as a percent with respect to a reference sample. The percent is the number of cycles to failure for the sample being measured divided by the number of cycles to failure for a reference sample time 100 percent. Typically, the coatings of the invention have a scrub resistance of 900 percent or greater.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
   applying a sealer composition to a substrate, the sealer composition comprising:
   a first component including:
   water; and
   a hydroxyl functionalized acrylic resin;
   a second component consisting of:
   an epoxy silane cross-linker, the sealer composition being applied by:
   a) mixing the first component and the second component;
   b) coating the substrate with the mixture of the first component and the second component on the substrate; and
   c) allowing the mixture to cure to form a sealer coating on the substrate, wherein the hydroxyl functionalized acrylic resin is present in an amount of 75 to 95 percent of the dry weight of the combined weight of the first component and the second component;
   the epoxy silane cross-linker is present in an amount of 5 to 25 percent of the dry weight of the combined weight of the first component and the second component; and
   the balance being water.

2. The method of claim 1 wherein the substrate is a concrete or masonry substrate.

3. The method of claim 1 wherein the substrate is metal, pavement, artificial stone or stucco.

4. The method of claim 1 wherein the sealer coating is topcoat over a paint or stain.

5. The method of claim 1 wherein the sealer coating is a dry erase coating.

6. The method of claim 1 wherein the substrate is a pre-coated substrate with paint, coatings or stains, the sealer coating being a clear topcoat.

7. The method of claim 1 wherein the hydroxyl functionalized acrylic resin includes a hydroxyl functional acrylic polymer.

8. The method of claim 1 wherein the hydroxyl functionalized acrylic resin is a solution polymer or an emulsion polymer.

9. The method of claim 1 wherein the first component further comprises an additive selected from the group consisting of rheology modifiers, surfactants, defoamers, organic solvents, pH adjusters, UV stablizers, dispersants, coalescents, inorganic pigment, organic pigment, and biocides.

10. The method of claim 1 wherein the epoxy silane cross-linker comprises a component selected from the group consisting of:

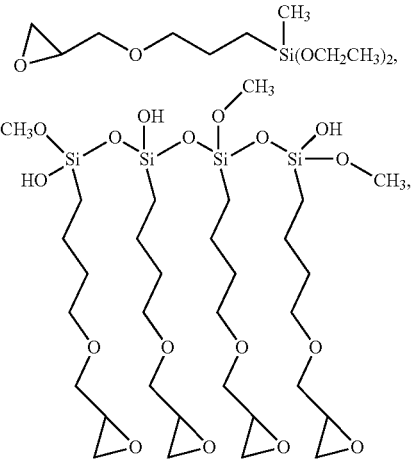

glycidoxypropyl trimethoxysilane,
and combinations thereof.

* * * * *